D. L. ADAIR.
Bee Hive.
No. 68,141.　　　　　　　　　　Patented Aug. 27, 1867.
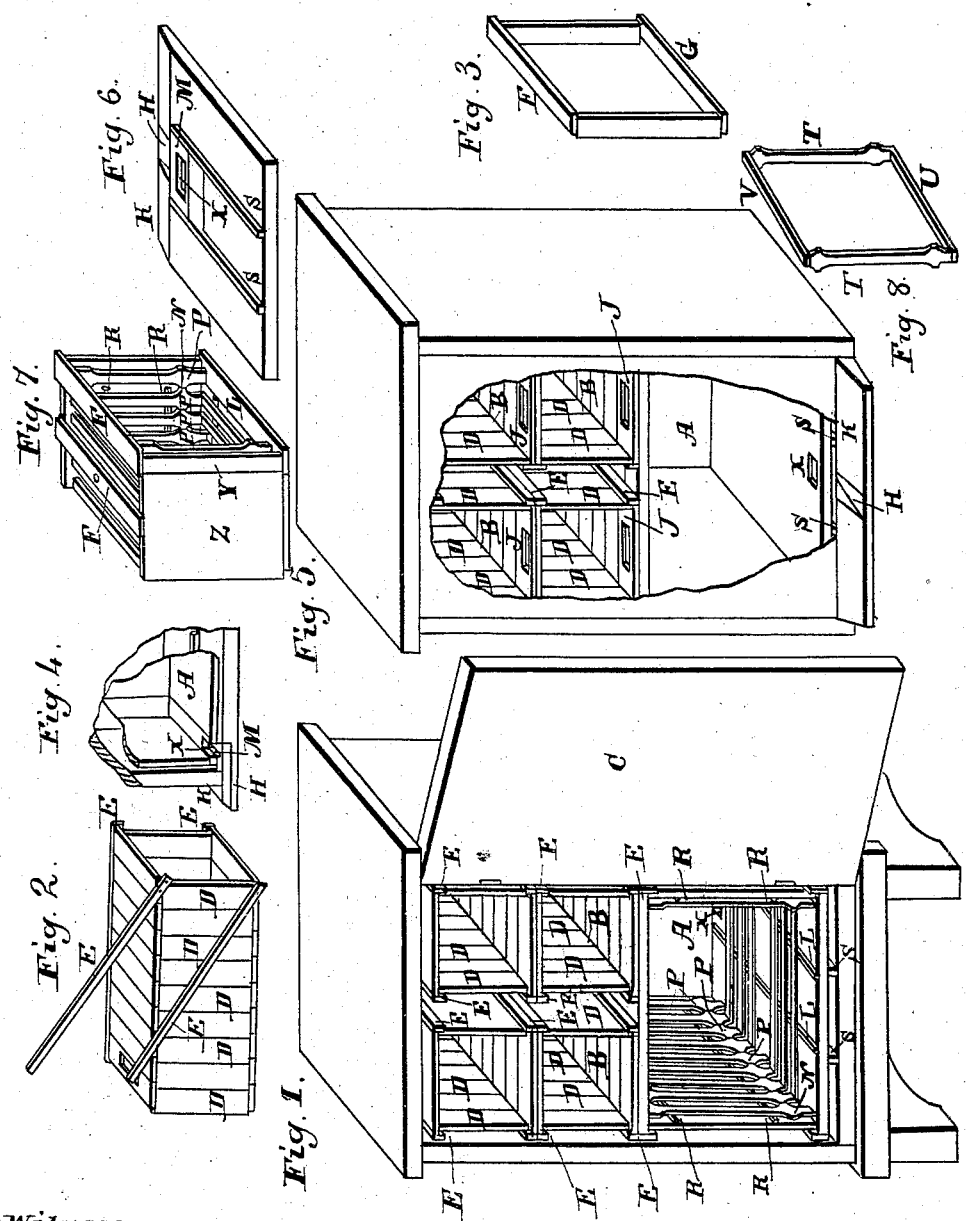

United States Patent Office.

DAVIS L. ADAIR, OF HAWESVILLE, KENTUCKY.

Letters Patent No. 68,141, dated August 27, 1867.

---

IMPROVEMENT IN BEE-HIVES.

---

The Schedule referred to in these Letters Patent and making part of the same.

---

TO ALL WHOM IT MAY CONCERN:

Be it known that I, DAVIS L. ADAIR, of Hawesville, in the county of Hancock, in the State of Kentucky, have invented a new and useful improvement on a Bee-Hive; and I do hereby declare that the following is a full and exact description thereof, reference being had to the accompanying drawings, and to the letters of reference marked thereon.

The nature of my improvement consists in forming the different chambers, apartments, and honey-boxes of a bee-hive of a series of vertical sections or rims, so fitted to each other, in sufficient number, as to form close boxes of the size required, to each of which sections or rims are attached comb-guides, which are made by dipping strings or cords in melted bees-wax, or bees-wax and resin, which, when warm, are pressed against the wood, to which they adhere, and are thus easily fastened to the under side of the top piece of each section, so as to induce the bees to form each piece of comb and honey where it is desired. This answers for the honey-boxes, as they are small, but in the brood or lower larger chamber, to prevent the bees from attaching their combs, or working where it is not desired, I first cover the under side of each top piece of each section with Canton flannel, or other soft fabric, or their equivalent, by pasting, gumming, or glueing the same thereto, and fasten, by tacking thereon as a comb-guide, where it is desired the comb should be, a triangular piece of wood, dipped in melted wax, or a cord, as before described, and when it is desired that the combs and honey should be of a greater than usual thickness I also use the Canton flannel, as stated, and by making the sections deeper, and thus placing the comb-guides wider apart I secure the formation of the combs of surplus honey of any reasonable thickness. By this arrangement, when the sections are taken apart, none of the combs will be broken, or I sometimes make the main or brood-chamber to enclose frames. The whole is enclosed by an outer case or box, for protection from the weather and the moth and other enemies to the bees.

Figure 1 is a perspective view of the rear of the hive, with the door C of the outer case open, showing A, the lower or brood-chamber, B B B B honey-boxes. The ends of the brood-chamber, as well as the honey-boxes, are closed with glass, so that when the door C is opened the inside of the boxes may be observed. There is a space between the brood-chamber and honey-boxes on every side, which insulates the inner cases or boxes, so as to secure greater warmth in winter and less heat in summer.

Figure 2, a surplus-honey box, the end of which is shown in fig. 1, B B B B, showing the manner of connecting the sections D D D D, &c. The strips E E, that hold the sections together, are loosened at one end and elevated to show the same. They are shown in place in fig. 1. This figure will also serve to represent the lower or brood-chamber, as it is constructed and joined together in substantially the same manner, the proportions only being different.

Figure 3 is a separate plain section of the proportions used in the lower or brood-chamber. It is formed by nailing together four thin pieces of wood; for the brood-chamber they are generally about one-half inch in thickness, and for the honey-boxes about half that thickness; they are all about one and a half inch wide, and of the proper length to make the sized box required. The upper piece F and the lower piece G project slightly beyond the other two pieces in front, and set back the same distance from the edge of the same in the rear, so as to form shoulders, so that when the sections are joined together they fit into each other so as to hold them to their proper places, as shown in fig. 2. A sufficient number of such sections being so put together, a narrow wooden strip, E E, fig. 2, or its equivalent, is nailed or screwed to each corner of the box lengthwise, as shown on the upper boxes in fig. 1, E E E, &c., to hold the whole together firmly.

Figure 4 is a transverse sectional view of the lower front part of the hive, through the centre of the entrance, from front to rear. H is the entrance, which is cut in the bottom of the outer case, so far as to lead the bees under the brood-chamber A, from whence they ascend through the hole in block M and hole X in bottom of brood-chamber A, and enter the same.

Figure 5 is a front view of the hive, showing K, the alighting-board, which is formed by projecting the bottom board of the outer case, and bevelling the same off so as to shed the rain. H is the entrance-hole cut in said bottom board. The front of the outer case is represented as being cut partly away, and also the back ends of the brood-chamber and honey-boxes as being left out, so as to show the holes or passages for the bees, X J J J J, into the brood-chamber A, and thence to and through the honey-boxes B B B B. Holes for the passage of the bees are cut in the top of the brood-chamber A, corresponding to the holes J J in lower tier of boxes B B, by means of which the bees enter said boxes, through which they pass to similar holes in the top of said lower tier of honey-boxes, corresponding to the holes J J in the upper tier of boxes B B, and so to the third tier, if so many are desired. The holes J are cut opposite to like holes in the top of the honey-boxes, (see J, fig. 2.)

Figure 6 is the bottom board of the outer case, showing L L, two wooden strips, one-fourth to one-half an inch high, upon which the brood-chamber rests, and on which it slips in and out, and which lifts the same off the bottom, leaving space under it for insulation, and which in use is partly filled with salt to keep out ants and the moth, and to preserve the bottom of the hive from rotting. M is a block of wood, to fill up so much of said space as is necessary to continue the entrance, and by means of a hole, X, through the same, to connect the brood-chamber with the entrance-hole H in the bottom board.

Figure 7 is two combined sections of the brood-chamber connected, showing how they are used when frames are used. One section, Z, is represented as deep as five plain sections, as shown in fig. 3, and holds five frames, corresponding in depth to the plain section aforesaid. The centre one, N, is attached permanently to the top piece F O and to the bottom of the section, and has no upper or lower bar, in fact is a sham or blind frame, placed there for the purpose of holding the real frames P P to their places. The frames P P P P fill out the section, and are set in loose on the strips L L, (see fig. 1,) and kept the proper distance from the sides by the triangular side strips R R R R, (see fig. 1.) The other section Y also contains a blind frame, N P, and when fixed to its place, as represented in this figure, supports the frames P P and holds them to their places. The chamber, when filled out, (see fig. 1,) has a like section at the opposite end to hold the other two frames firmly, and may be filled out to the desired length with like sections, or with plain sections, like fig. 3, or the whole chamber may be formed of sections which are three-fifths of the depth of Z, fig. 7, and hold two frames, P P, and the blind frame N, three such sections forming the chamber; or it may be composed wholly of plain sections, like fig. 3, or entirely of sections like Y, fig. 7, or of any combination of those sections desirable or corvenient; or the frames may be set in a solid-sided box on strips L L, figs. 1 and 7, and held to their proper places from the sides by strips R R R R, same figures, the top covered with movable honey-board or boards, so that the frames may be lifted out at top, and by having the front or glazed end movable they may be taken out at the end. To accomplish this I make the brood-chamber the depth of one section short of the desired length, and fill it out with a combined section like Y, fig. 7.

Figure 8 is the frame intended to be used in this combination. The two upright or side pieces T T are cut out of thin pieces of wood, corresponding in width to the uprights in the section, fig. 3, leaving them full width near the upper and lower ends. The bottom cross-bar U is nailed to the lower ends of said upright or side pieces T T, and the top bar V is nailed to the upper ends of the same. The ends of these two bars extend out only even with the outside of said upright or side pieces T T. They have no projections of the upper bar V, for the purpose of suspending the frames, or keeping them at the proper distance from the sides of the hive, as all the frames now in use have, and no extension of the side pieces T T down below the bottom bar U, as some of them have, for the purpose of keeping the frames from the bottom board, but are, when in the hive, kept the proper distance from the bottom by the strips L L, fig. 7, and from the sides by the triangular strips R R R R, same figure. (See also fig. 1.)

When it is desired to open the brood-chamber A the honey-boxes B B B B may be taken off, which is done by inserting under each box, as you move it, a piece of tin or zinc, sufficiently long and wide to sever the gum holding it to the under box or brood-chamber, which also cuts off communication. A second piece of tin or zinc should be then inserted, so that when the box and one sheet of metal are drawn out the bees will be confined in the honey-box by the metal sheet drawn out, and in the box or chamber below by the other sheet which is left on. When all the honey-boxes are removed the brood-chamber may be taken out in the same way. By removing the screws and taking off the strips E E the sections may be all separated, by inserting the point of a strong knife, or some similar instrument, between the sections, when the sections may be replaced, if desired, or a part of them, with the proper brood-comb, taken out for the purpose of artificial swarming, or any other purpose, and their places filled with empty sections, or any new combinations of sections made, as each section, whether plain, like fig. 3, or combined, as described under fig. 7, will fit any other section.

This arrangement of forming the hive of sections, obviates the great difficulty experienced in removing and working with any of the loose or movable frame-hives, as, however well they may work or operate at first, and while they are not gummed and glued up with the propolis, they soon become warped and obstructed, so that they are a great annoyance to the bee-keeper, and after the hives have been used a year or two many become worthless, or nearly so, for the purposes for which they were intended.

If the honey-boxes are all placed on the brood-chamber at once, in the spring, the bees will generally commence working in the lower ones first, and, if not interrupted, will fill them out before going into those above, but when the bees have formed comb in three or four sections they should be taken out and raised up and placed on top of the second tier, the said second tier being thus brought down to occupy their places. The bees will immediately commence work in the boxes thus brought down, when, if there be a third and fourth tier, they should each in turn be shifted to the bottom, raising those partly filled. By this management all of the honey-boxes will be filled nearly as quickly as the first two would have been, and the yield of surplus honey more than doubled in a given time.

I file herewith a circular, which I intend issuing, marked A, and made a part of this specification, for the purpose of showing the advantages and utility of my improvement.

I do not claim the use of movable comb-frames in bee-hives, as they were used by Huber, Taylor, and Munn, as stated in the circular herewith filed, and were patented to Rev. Lorenzo L. Langstroth in 1852. Neither do I claim the use of comb-guides in bee-hives, for I am aware that triangular strips of wood, and also pieces of comb, have been used for a number of years. But what I do claim as new, and desire to secure by Letters Patent, is—

1. The honey-box, constructed as described, consisting of the sections D, provided with the projecting top and bottom pieces F G, fitting over the tops and bottoms of the vertical pieces, secured together by the strips E, whereby vertical movement of separate sections is avoided, as herein set forth for the purpose specified.

2. The sections of the brood-chamber, constructed as described, consisting of the removable frames P P, blind frames N N P, sides Z, and sections Y, all arranged as described, and sliding over the bottom guides S and between the triangular side strips R, as herein set forth for the purpose specified.

D. L. ADAIR.

Witnesses:
W. S. THOMAS,
D. W. JETT.